(12) United States Patent
Alfonsi et al.

(10) Patent No.: US 11,898,543 B2
(45) Date of Patent: Feb. 13, 2024

(54) HIGH EFFICIENCY TURBINE IMPELLER

(71) Applicants: UNIVERSITA' DELLA CALABRIA, Rende (IT); OFFICINE MECCANICHE ZEMA, Casale Litta (IT)

(72) Inventors: Giancarlo Alfonsi, Milan (IT); Agostino Lauria, Montalto Uffugo (IT)

(73) Assignees: UNIVERSITA' DELLA CALABRIA, Rende (IT); OFFICINE MECCANICHE ZEMA, Casale Litta (IT)

( * ) Notice: Subject to any disclaimer, the term of this patent is extended or adjusted under 35 U.S.C. 154(b) by 0 days.

(21) Appl. No.: 17/780,091

(22) PCT Filed: Nov. 17, 2020

(86) PCT No.: PCT/IB2020/060821
§ 371 (c)(1),
(2) Date: May 26, 2022

(87) PCT Pub. No.: WO2021/111226
PCT Pub. Date: Jun. 10, 2021

(65) Prior Publication Data
US 2022/0412314 A1 Dec. 29, 2022

(30) Foreign Application Priority Data
Dec. 4, 2019 (IT) .......... 102019000022923

(51) Int. Cl.
F03D 9/37 (2016.01)
F03D 3/06 (2006.01)
F03D 3/00 (2006.01)

(52) U.S. Cl.
CPC .............. *F03D 9/37* (2016.05); *F03D 3/005* (2013.01); *F03D 3/062* (2013.01);
(Continued)

(58) Field of Classification Search
CPC . F03D 3/005; F03D 3/065; F03D 9/37; F05B 2240/131; F05B 2240/912; F05B 2250/323; F05B 2250/5011
See application file for complete search history.

(56) References Cited

U.S. PATENT DOCUMENTS

| 9,206,784 B2 | 12/2015 | Alfonsi |
| 9,284,945 B2 * | 3/2016 | Brendle ............ F03D 3/0454 |
| 2009/0315332 A1 | 12/2009 | Sheikhrezai |

FOREIGN PATENT DOCUMENTS

| CH | 86082 A | 10/1920 |
| CN | 102713158 A | 10/2012 |

(Continued)

OTHER PUBLICATIONS

International Search Report, issued in PCT/IB2020/060821, dated Feb. 11, 2021, Rijswijk, NL.

*Primary Examiner* — Juan G Flores
*Assistant Examiner* — Jason G Davis
(74) *Attorney, Agent, or Firm* — ArentFox Schiff LLP; Michael Fainberg

(57) ABSTRACT

A high performance hybrid turbine is provided which has an impeller towards which a fluid flow of water, air, or other fluid is conveyed for rotation of the impeller around an axis of rotation. The impeller exploits the thrusts that the fluid flow exerts on the elements constituting the impeller and the thrusts generated by a certain number of airfoils provided inside the elements of the impeller. The high performance hybrid turbine, if used as a wind turbine, can operate at much higher wind speeds than conventional wind turbines.

11 Claims, 14 Drawing Sheets

(52) U.S. Cl.
CPC ... *F05B 2240/131* (2013.01); *F05B 2240/912* (2013.01); *F05B 2250/323* (2013.01); *F05B 2250/5011* (2013.01)

(56) References Cited

FOREIGN PATENT DOCUMENTS

| | | |
|---|---:|---|
| FR | 843638 A | 7/1939 |
| GB | 2013790 A | 8/1979 |
| IT | 1396927 B1 | 12/2012 |
| WO | 2006/089425 A1 | 8/2006 |
| WO | 2017158088 A1 | 9/2017 |
| WO | 2019071074 A1 | 4/2019 |

* cited by examiner

HIGH EFFICIENCY TURBINE IMPELLER

CROSS-REFERENCE TO RELATED APPLICATIONS

This application is a National Phase Application of PCT International Application No. PCT/IB2020/060821, having an International Filing Date of Nov. 17, 2020 which claims priority to Italian Application No. 102019000022923 filed Dec. 4, 2019, each of which is hereby incorporated by reference in its entirety.

FIELD OF THE INVENTION

The present invention deals with a high performance hybrid turbine.

BACKGROUND OF THE INVENTION

The state of the art includes different types of turbines that can mainly distinguished in action turbines, in which the flow pressure does not change during the process of interaction between the fluid stream and the impeller (as in the Pelton turbine) and in reaction turbines, in which the flow pressure varies during the course of the interaction process between the flow and the impeller (as in Francis and Kaplan turbines).

Regardless of the transformations undergone by the pressure, another characteristic to be used to distinguish among turbines of a known type is the main direction followed by the fluid flow once it has come into contact with the impeller. Therefore, it is possible to distinguish turbines with radial flow (in which the flow moves mainly on the rotation plane of the impeller, at a certain distance from its axis of rotation, i.e. it enters at a certain value of the radius and exits at a smaller value, as in the case of the Francis turbine), axial flow turbines (in which the flow moves mainly in a direction parallel to the impeller axis, as in the case of the Kaplan turbine) and mixed-flow turbines, in which the fluid flow moves partly in the radial direction and partly in the axial direction.

Another classification of known type turbines can be made based on the type of fluid treated. A distinction can be made between water turbines, steam turbines, gas turbines and wind turbines. In hydraulic turbines, a current of water is directed towards one impeller in order to put it into rotation and to be able to produce electricity from an alternator connected to a shaft, as happens in a hydroelectric power plant. The water flow, free and at atmospheric pressure as in the case of the Pelton turbines, or ducted and at a higher pressure than that of the external environment as in the case of the Francis and Kaplan turbines, comes from a penstock which is generally fed by an artificial basin created from a dam. The energy of the flow in the penstock, net of head losses, is partly pressure and partly kinetic. In the case of the Francis and Kaplan turbines, the current at the end of the penstock, is directed towards the impeller by means of a further duct, therefore with an energetic load that is still partly pressure and partly kinetic. In the case of Pelton turbines, the penstock ends with an outlet nozzle in the atmosphere and therefore the energy of the flow is completely converted into kinetic energy only. Then the same current is directed towards the impeller and therefore in the latter case the energy of the current that interacting with the impeller is exclusively of kinetic type. In the case of steam turbines the pressure value of the fluid, clearly higher than the external pressure, necessary for operation of the apparatus, is reached by introducing heat into the circuit coming from a boiler in which some fuel is burned, such as in thermoelectric or thermonuclear power plants. In the case of gas turbines the high pressure values, much higher than the external pressure, necessary for the operation of the apparatus, are reached by means of a chemical reaction involving a fuel and air in a combustion chamber, such as in a jet engine. In the case of wind turbines a wind flow at atmospheric pressure, therefore possessing only kinetic energy, rotates the blades (airfoil profiles) in free air connected to a shaft where the latter is in turn connected to the impeller of an alternator.

There is a number of patents (see Bibliography), especially in the wind field, which recall these types in various ways.

In particular, in the patent documents [6]-[8] the constituent elements of the turbine impeller had as a fundamental feature the fact of presenting slits that put these impeller thrust ducts (its constituent elements) in communication with the external environment, in order—for example, in the case that the impeller was used as a turbine wind power—to suck air from the external environment to increase the flow rate inside the thrust ducts.

In all types of existing turbines, one can be distinguished fluid inlet section (be it liquid, gas, or multiphase) and outlet section of the same fluid. The geometric dimensions of the inlet section (are A) and the average value of the velocity V of the fluid at the inlet, determine the fluid flow rate Q that enters the machine (Q=VA, the volume per unit of time if the density of the fluid ρ is constant, Q=ρVA, the mass per unit of time if the density of the fluid can vary). In all existing turbines, at each predetermined operating point of the machine, the fluid flow remains constant between the inlet section and the outlet section of the machine itself. Hence, being the power of the flow at the inlet section of the machine (energy per unit of time) equal to:

$$P_{flow} = \tfrac{1}{2} \rho Q V^2 \qquad (4.1)$$

(measured for example in kW if the International System of Units of Measurement is used), the mechanical power obtainable at the turbine shaft itself is equal to:

$$P_{turbine} = \eta \tfrac{1}{2} \rho Q V^2 \qquad (4.2)$$

where η is the efficiency of the machine. Therefore the expression (4.2) tells us that the mechanical power that can be obtained at the shaft of a turbine depends (in addition to the density of the fluid that is used and taking into account the efficiency of the apparatus) on the characteristic values of the flow entering the machine, that is the flow rate Q and the average velocity V. Therefore, for example, the construction of turbines with high power necessarily involves the increase of the values of the input flow rate or the average velocity of the oncoming flow, or both of these quantities.

This implies the need to build large industrial plants dimensions, with consequent high production, installation and management costs, as well as, of course, the effective availability of high fluid flow rates (and flow speed) to be introduced into the machines.

Another problem that characterizes for example the existing wind turbines with three blades and horizontal axis is the low robustness, and therefore the limited maximum value of the wind speeds at which they can operate (about 25 m/s). When the wind velocity exceeds these values, the wind turbines—to ensure that they are not damaged to the point of breaking up) must be stopped, the blades are oriented "flag" with respect to the direction of the incoming wind (they do not develop any more lift) and are allowed to remain in this condition until the end of the unfavorable atmospheric event. These days, we are faced with evident phenomena of climate change, characterized by the fact that extreme atmospheric events (strong winds, etc.) are increasingly frequent. Furthermore, there are areas of the Earth, at the latitudes closest to the Poles, where the winds are usually very strong, and therefore traditional wind turbines cannot be installed. In order to solve this problem, it is necessary to introduce more robust wind turbines, such as that of the present invention. The airfoil_profiles of the existing turbines are anchored to the hub only at one point and are then free in the air along their entire length. They are therefore "fragile" because, under the action of the wind, they can break up at the point of attachment with the hub.

SUMMARY OF THE INVENTION

The object of this invention is to provide an improved wind turbine that solves the problems and overcomes the disadvantages of the anterior technique, in whole or in part.

The subject matter of the present invention is a hybrid turbine according to attached claims.

BRIEF DESCRIPTION OF THE FIGURES

The invention will be now described as illustrative but not limitative purposes, with particular reference to the drawings of the attached figures, listed as follows.

DETAILED DESCRIPTION

Figure 1:
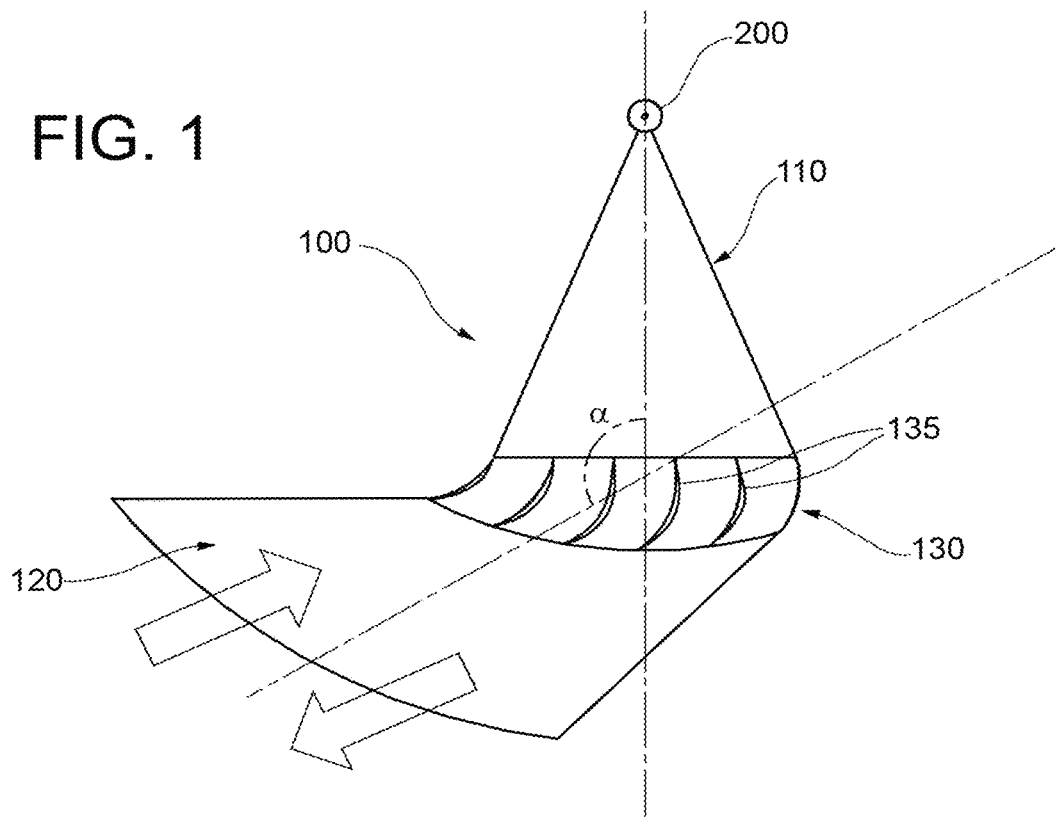
FIG. 1. Top view, in "wireframe" mode, of a single constituent element of the impeller (thrust duct, 1 of 8).

It is specified here that elements of different embodiments can be combined together to provide additional embodiments without limits respecting the technical concept of the invention, as the person skilled in the art understands without problems from what described.

The present description also refers to the known technique for its implementation, regarding the detail features not described, such as, for example, elements of lesser importance usually used in the known art in solutions of the same type.

When one introduces an element one always mean that it can be "at least one" or "one or more".

When listing a list of items or features in this description one means that the device according to the invention "includes" or alternatively "is composed of" such elements.

EMBODIMENTS

As seen above, action turbines and reaction turbines exists. The present invention concerns a hybrid turbine in the sense that it works partly as an action turbine and partly as a reaction turbine.

We have also seen that, in turbines of the known art, the direction of the flow in the impeller can be radial or axial. The present invention is of a mixed (multiple) flow type in the sense that the path of fluid flow in its interaction with the impeller is essentially tangential at the inlet, then becomes radial, then axial, then radial again, and at the outlet it becomes essentially tangential again.

Furthermore, with regard to the classification of hydraulic turbines, steam turbines, gas turbines and wind turbines, the present invention can operate with a fluid flow in the liquid phase, gaseous, and even multiphase, but does not involve chemical reactions or combustion processes.

As compared with the aforementioned patent documents [6]-[8], there are a number of differences, including the absence of the aforementioned slits, and instead there are, inside the thrust ducts, both in the inlet and in the outlet section of the flow, a certain number of airfoil profiles to increase the rotational force generated by the interaction between the fluid flow and the elements of the impeller. The present invention also provides for a number of separator units located in the curved section attached to the rotation axis where the fluid flow deviate of 180° (or other angle or path).

In the construction of turbines with high powers, with respect to the above mentioned problem, namely that of raising the values of the input flow rate or the average velocity of the input flow, or both of these quantities, the present invention solves this problem in two ways.

The first is related to the amount of the machine performance. In fact, the hybrid character of the present turbine impeller allows to extract power from the machine using both the typical methods of the internal flows (thrusts discharged on the constitutive elements of the impeller), and those related to the development of the forces around the airfoil profiles that are arranged inside the same elements of the impeller (the so-called thrust ducts). The present impeller efficiency is therefore considerably higher than that of known turbines (also by considering the presence of separator baffles that allow a better behavior of the fluid flow in the curved section attached to the rotation axis in which the deviation of 180° or other angle or path of the flow takes place), and therefore has the advantage of being able to build smaller machines (and therefore with less complexity and lower costs) with the same power output.

The second way to solve the mentioned problem is related to modularity characteristics of the turbine impeller of the present invention. By thinking for example to the wind turbines (and leaving apart for the moment those with a vertical axis such as Savonius and Darrieus type, which are little used), the most common ones are with a horizontal axis and are generally moved by three blades which, under the action of the wind, develop the necessary lift to induce rotary motion. The power of such machines depends on the size of the blades (length) so, when one wants to build wind turbines with increasing power, it is necessary to build ever larger wind turbines, in increasingly larger industrial plants, so facing technological and cost limits, sometimes difficult to overcome. The present invention, on the other hand, and mainly due to its shape, is modular, in the sense that an impeller with a certain power can be built in a single industrial plant in a large number of identical specimens, even using assembly line techniques, therefore with a considerable cost saving compared to traditional wind turbines which are instead built one by one. Then, depending on the power of the final machine to be assembled, the impellers of the present invention can be mounted on the support tower one above the other in the desired number, thus configuring a wind turbine with the desired power using multiple impellers all equal to each other. This leads to great advantages in terms of costs and simplicity of manufacture and assembly.

With respect to the problem of resistance of wind turbines, the impeller of the present invention is instead very robust mainly by virtue of its particular shape and compact structure around its axis of rotation. Laboratory tests carried out on a prototype of a small-scale impeller exposed to the air flow of a wind tunnel, were conducted up to a speed of 170 km/h without any particular negative consequences.

Description of a General Embodiment

The impeller of the present description consists of a supporting frame and a certain number (typically, 8) of constitutive elements (thrust ducts, or the bodies in which the thrusts develop as a result of the interaction with the fluid flow that runs over them).

The supporting frame is characterized by a circular geometry and it has the main function of transmitting, to the shaft (axis) of the machine, the generated moment by the forces that develop as a result of the interaction between the fluid current and the constituent elements of the impeller. This moment transfer function takes place through a structure of material with the necessary mechanical strength (aluminum, glass fiber, carbon fiber).

The constituent elements of the impeller of this description (material with the necessary mechanical strength, for example aluminum, fiberglass, carbon fiber) are ducts of complex shape, typically in number of 8. These thrust ducts are arranged (preferably in a regular way) to each other according to an angular sequence defined with respect to the rotation axis of the impeller.

The shape of each of these constituent elements develops along three directions, respectively the tangential, axial, radial and tangential again with respect to the impeller itself.

Being ducts, the constitutive elements have an inlet main flow section and an outlet main flow section.

Due to their shape, and along its path inside the ducts, the fluid flow, which enters the same ducts in an essentially tangential direction to the impeller, is first diverted in a radial direction through a converging section, then in an axial direction through a section with gradually narrow section, then again in a radial direction crossing a gradually diverging section, and then, again crossing a diverging section, it comes out again essentially tangentially to the impeller.

Referring to the classification of turbines, which is based on main direction followed by the fluid flow once it has come into contact with the impeller, the turbine of the present invention is therefore a mixed flow turbine. Overall, during its path inside the ducts, the fluid flow is deflected by the ducts themselves by an angle equal to 180°, as evaluated in a plane parallel to the axis of rotation of the impeller and tangent to a circumference having as radius the moment arm that is transmitted to the shaft.

The constitutive impeller ducts have the function to receiving the thrust that the fluid flow discharges on them. The ducts constituting the impeller of the present description also have the characteristic of presenting, optionally, a certain number of load-bearing profiles (airfoil) arranged both in the converging and in the diverging portion of the ducts themselves and arranged parallel to the axis of rotation of the impeller, which they have the function of increasing the force and therefore the moment around the axis of the impeller by virtue of the lift that develops as a result of the interaction between themselves and the fluid flow that runs through the ducts.

The constituent impeller ducts of the present invention also have the characteristic of optionally presenting a certain number of separator baffles inside the curved section integral to the axis of the machine (gradually converging at the inlet of the fluid flow and gradually diverging at the outlet) in which the 180° (or other angle and path) flow deviation takes place. These separator baffles facilitate the flow in its 180° deviation path, without the occurrence of separation wakes and consequent formation of unwanted vortices. The separator baffles can also have angles different from 180° and follow different paths similarly to what can happen in the impeller's constitutive ducts.

These issues are described in detail with reference to the figures.

Referring to FIG. 1 (top view), in "wire frame" mode, of a single constitutive element of the impeller (thrust ducts, 1 of 8), we can distinguish:
the initial section 110, converging towards the axis 200 of the impeller;
the final section 120, converging towards the axis 200 of the impeller; and
airfoil profiles 135 (optional, for example 5 as illustrated) in the sections in curve 130.

The arrangement of the final and initial section and airfoils is such as to form an angle α of flow path as defined in the figure. It is the angle between a median plane b of the final section 120, parallel to the axis 200, and a median plane a of the initial section 110 which passes through the axis 200. The value of a can be any, for example it is between 60 and 130 sexagesimal degrees, preferably between 85 and 105, ideally about 90 degrees, in order to collect a tangential flow to a circumference centered in the axis 200, and conveying it towards the axis 200.

Instead of the airfoil profiles, there can be simply curved chambers, made separately or in one piece with the initial 110 and final 120 sections.

Figure 2:
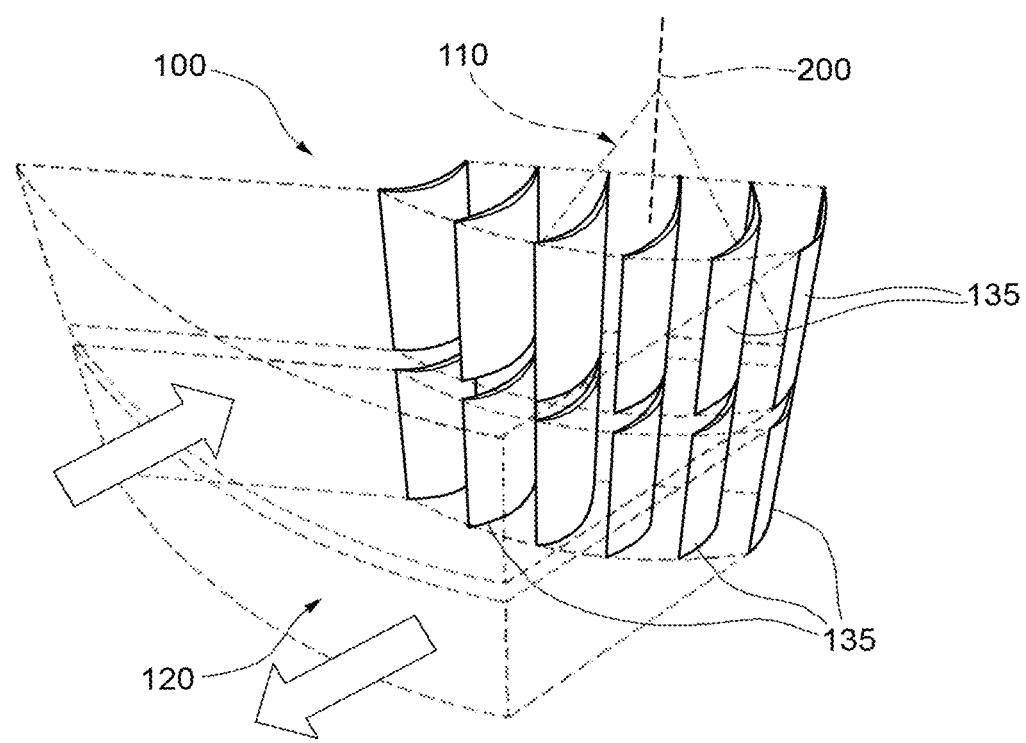
FIG. 2. Overall view of a single constituent element of the impeller in mixed mode "wire frame" and "rendering".
Figure 3:
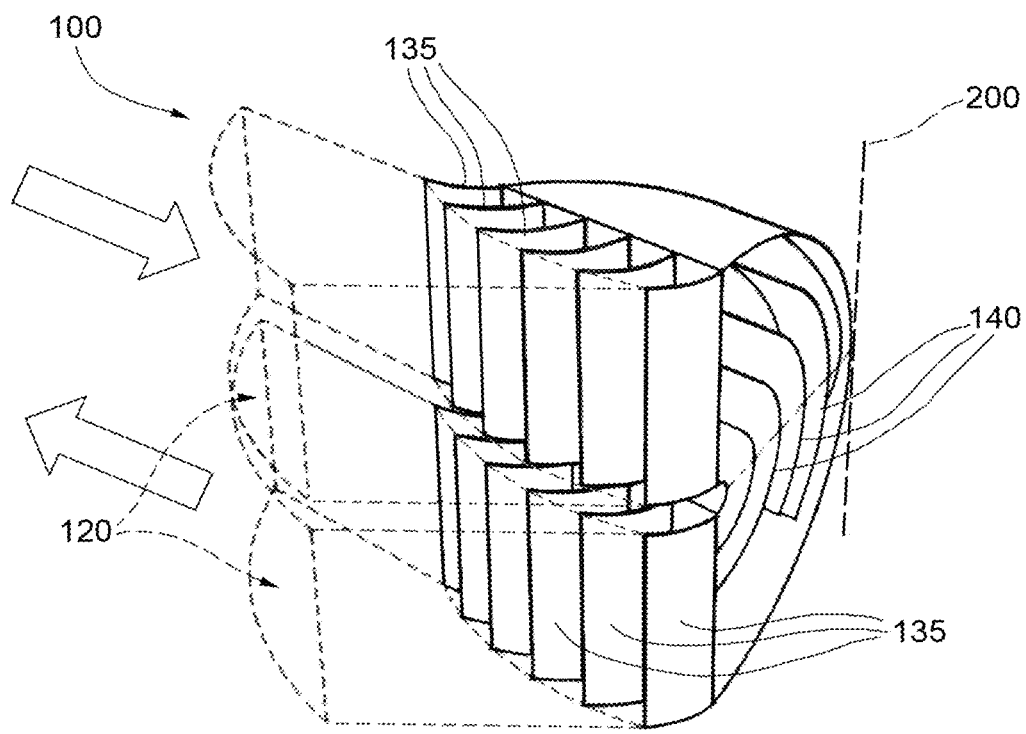
FIG. 3. Overall view of a single constituent element of the impeller in mixed "wire frame" and "rendering" mode.

FIG. 2 shows an overview in mixed "wireframe" and "rendering" mode of a single constituent element 100 of the impeller in which the converging section at the initial section 110, the airfoil profiles 135 in the inlet and outlet sections, and the diverging section 120 at the outlet are distinguished. It will be noted that the final sections 120 are double, as well as the are double the airfoil profiles 135, the final sections and the airfoil profiles being overlapped in the direction of the axis 200. For the same reason the initial sections 110 are also double and overlapping, however they are fluidically connected, as shown in FIG. 3 in which the overlapping initial sections are preferably in one piece with the fluidic connection and take the name of separating baffles 140. These separator baffles realize a 180° flow deviation. The separator baffles also divide the initial sections into several layers and this increases the efficiency of the flow and therefore of the impeller, but it is also possible to use two single chambers as initial sections 110, joined by a curved junction at one of their ends.

In general, the simulation results and the experimental results on prototypes show that the presence of the airfoil profiles, in the converging section at the initial section 110 and in the diverging section at the final section 120, considerably increases the force and therefore the moment around the axis of the impeller 1000, by virtue of the force that develops as a result of the interaction between the latter and the fluid flow.

Figure 4:
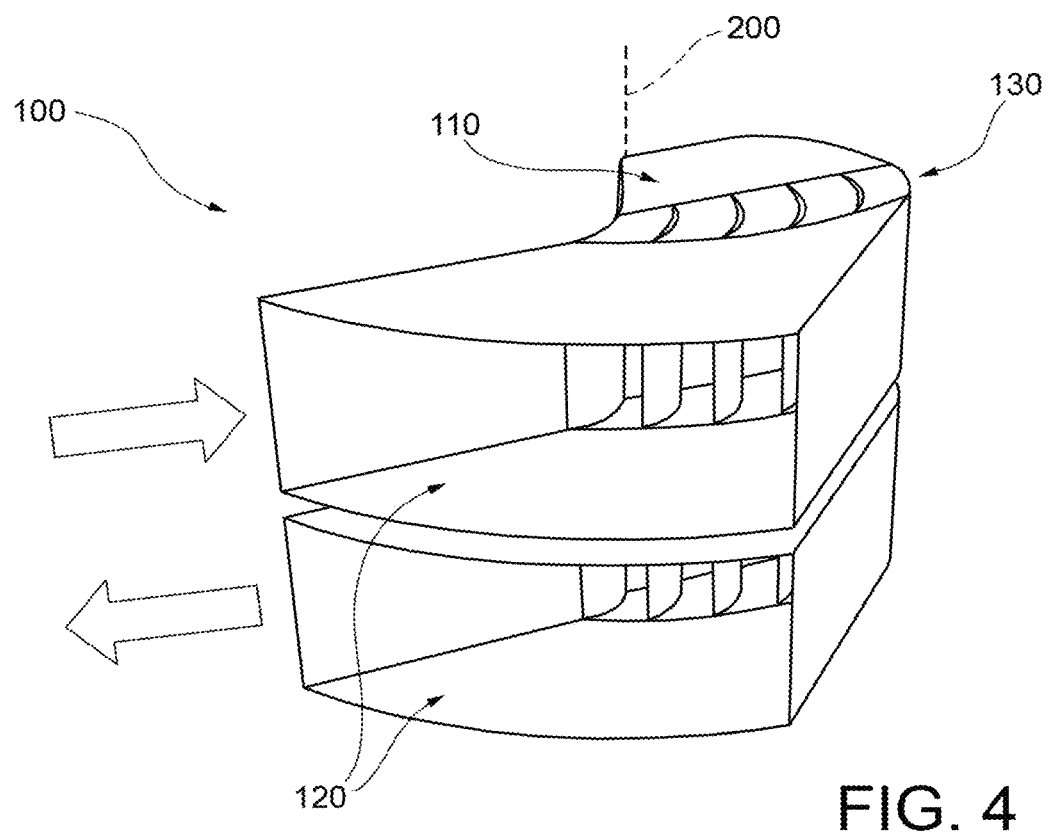
FIG. 4. Overall and complete view in "rendering" mode of a single constituent element of the impeller.

FIG. 4 shows an overview in "rendering" mode of a single constituent element 100 of the complete impeller.

Figure 5:
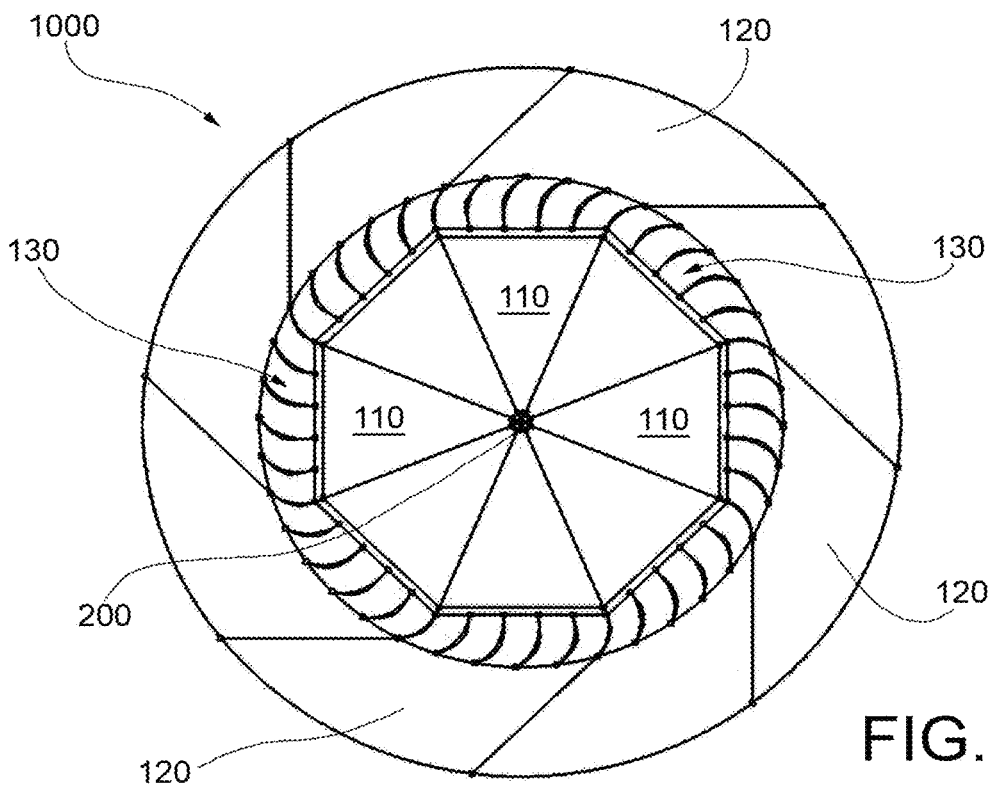
FIG. 5. Top view, in "wire frame" mode, of the entire impeller in its configuration with 8 constituent elements.

FIG. 5 shows a top view, in "wire frame" mode, of the entire impeller 1000 in its configuration with 8 constituent elements 100, each of which is shown in the previous FIG. 1.

Figure 6A:
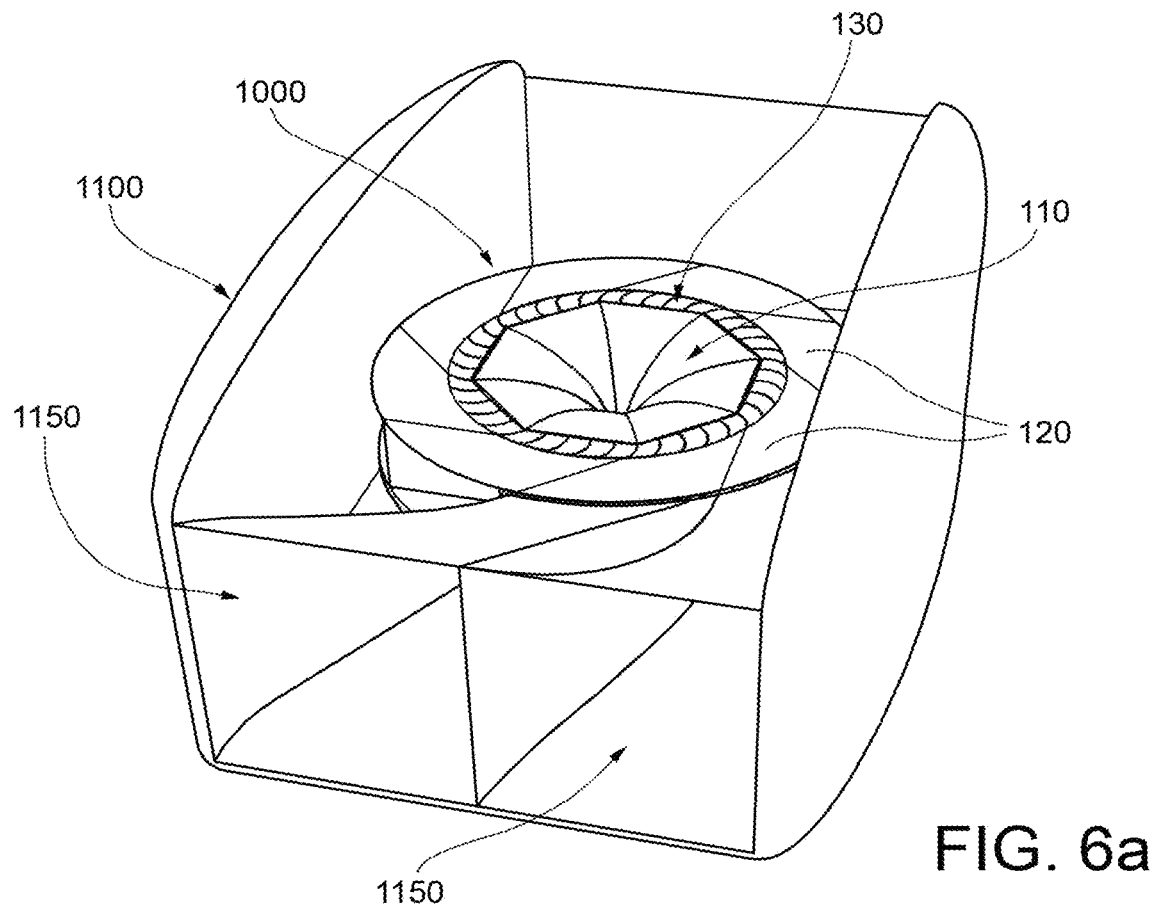
FIG. 6. Overall view in "rendering" mode of the entire impeller in its configuration with 8 constituent elements.
Figure 6B:
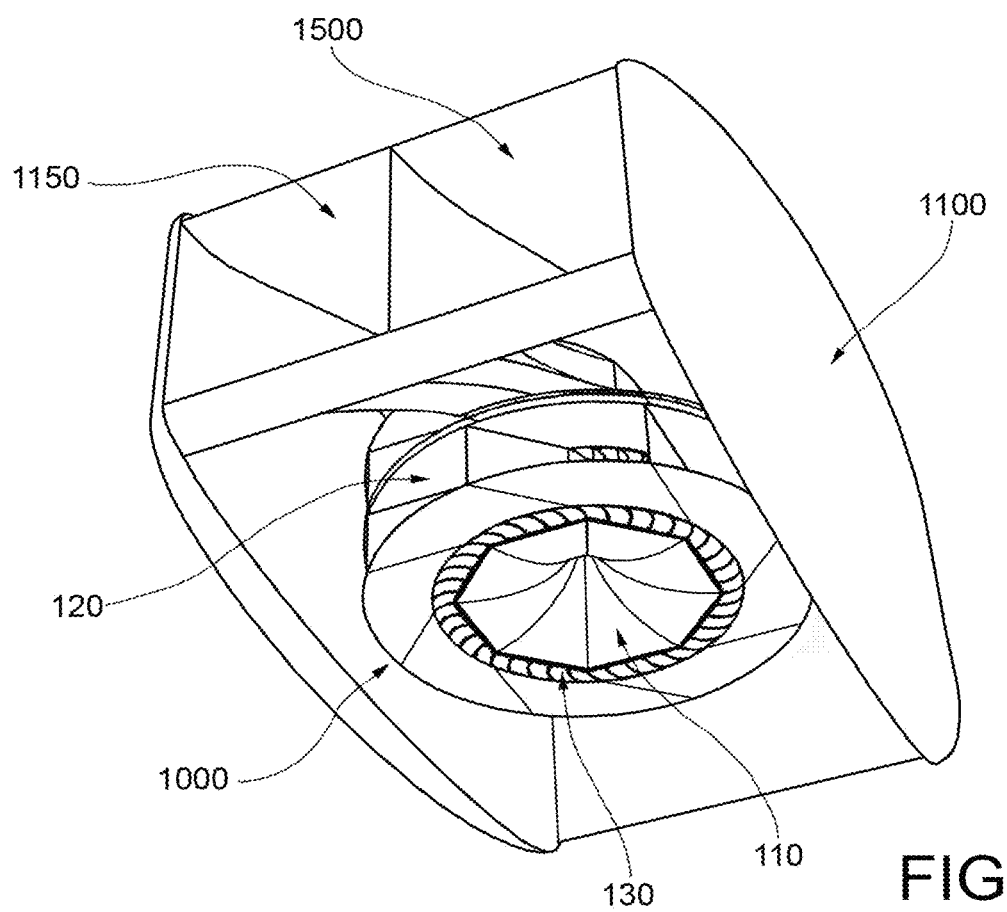

FIG. 6a shows a perspective view from above of a further, different embodiment of the invention, in which the turbine 1000 is inserted in an air conveyor device of which only two elements are shown. FIG. 6b shows the same arrangement from below, and it is clear from the two figures that the conveyor elements (diverging outwards) enter only the upper constituent elements of the turbine, while the lower elements are "free" inside an open area of the shell which holds the conveyor device. Consequently, the air that rotates the impeller enters the upper constituent elements, descends into the lower ones and exits the latter, and thus optimizes the motion of the turbine.

Of course, the flow could also be reverse, namely the air (in general the fluid) enters from the lower elements and exit from the higher, and in this case the conveyor elements would be fluidically connected to the lower constitutive elements, while the upper would be "free".

Applications

As mentioned above, the turbine impeller of the present invention can be used with any type of fluid (water, air, multiphase, etc.) and can be exposed, even with the addition of a fixed part (stator), to fluid flows that come from directions that may vary (omnidirectional flow) or even to fluid flows that come from only one direction (one-way flow). In the following, particular reference will be made to applications in the aeolian field.

Applications in the Case of Omnidirectional Flow

Figure 7A:
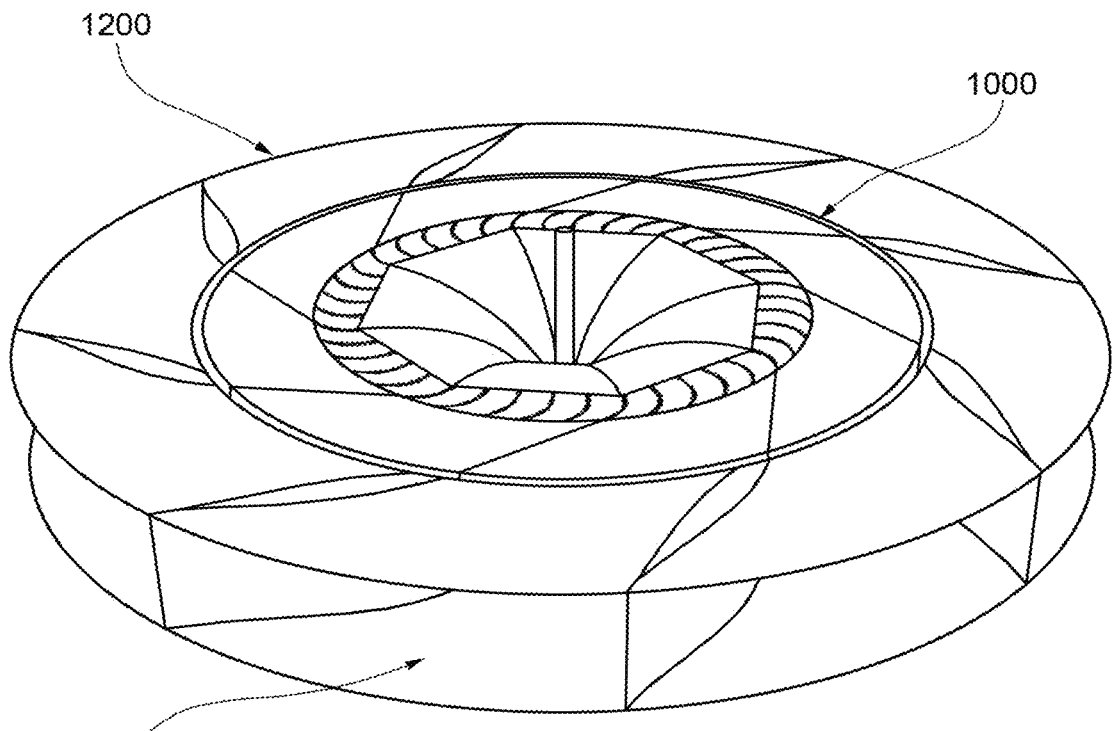
FIG. 7a. Overall view of the impeller in "rendering" mode coupled with an omnidirectional stator. Upper part.
Figure 7B:
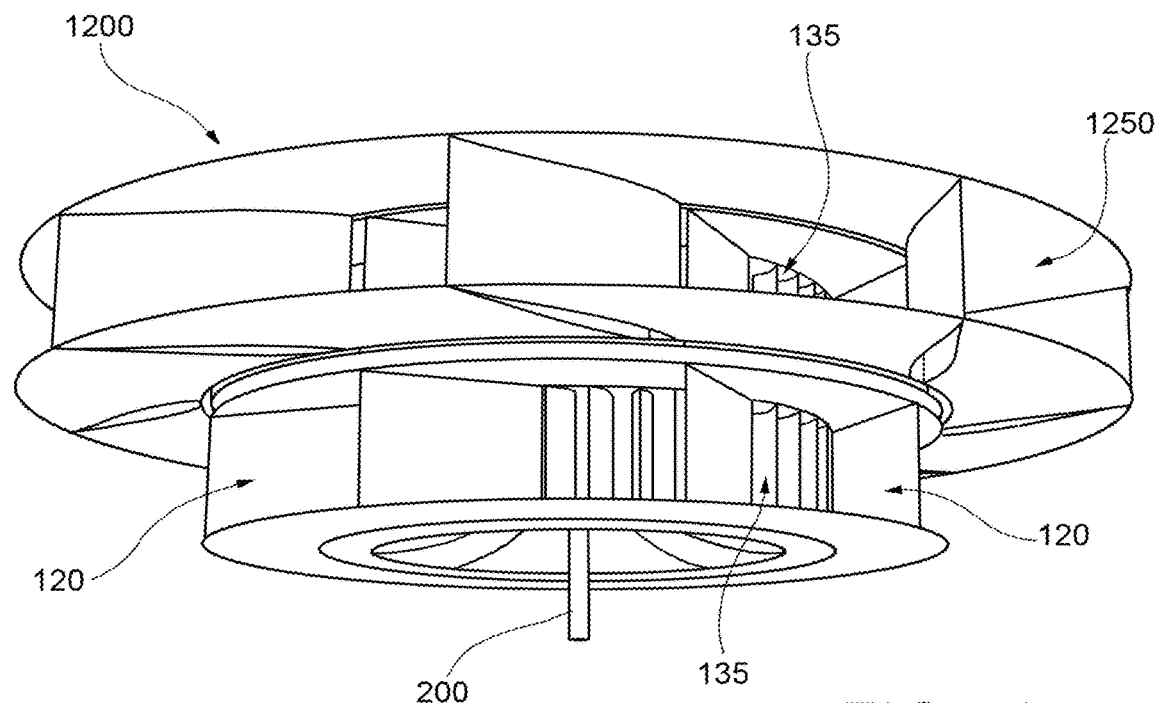
FIG. 7b. Overall view of the impeller in "rendering" mode coupled with an omnidirectional stator. Lower part.

As already mentioned, the main characteristics of the turbine according to this description are the particular shape, the high efficiency, the simplicity, flexibility of use and above all robustness. So in the aeolian field the main application of this turbine is to be exposed either individually or inside large "wind farms" in places characterized by the presence of strong winds (even coming from different directions depending on the weather conditions) to which traditional turbines cannot resist. FIGS. 7a and 7b show in "rendering" mode a turbine configuration of the present disclosure coupled to an omnidirectional stator or "conveyor device" 1200 with conveyor elements 1250, i.e. capable of catching wind from any direction. As in the case of the conveyor device 1100 of FIGS. 6a, 6b, the latter conveys the flow only towards the upper final sections 120, and not towards the lower portions.

Always in the context of omnidirectional wind flows, in the following are reported other types of applications of the turbine of the present description, mainly in the vertical axis configuration, which can be realized mainly in virtue of its particular shape which is such as to provide for the horizontal rather than vertical rotation plane as it occurs in traditional wind turbines.

Figure 8:
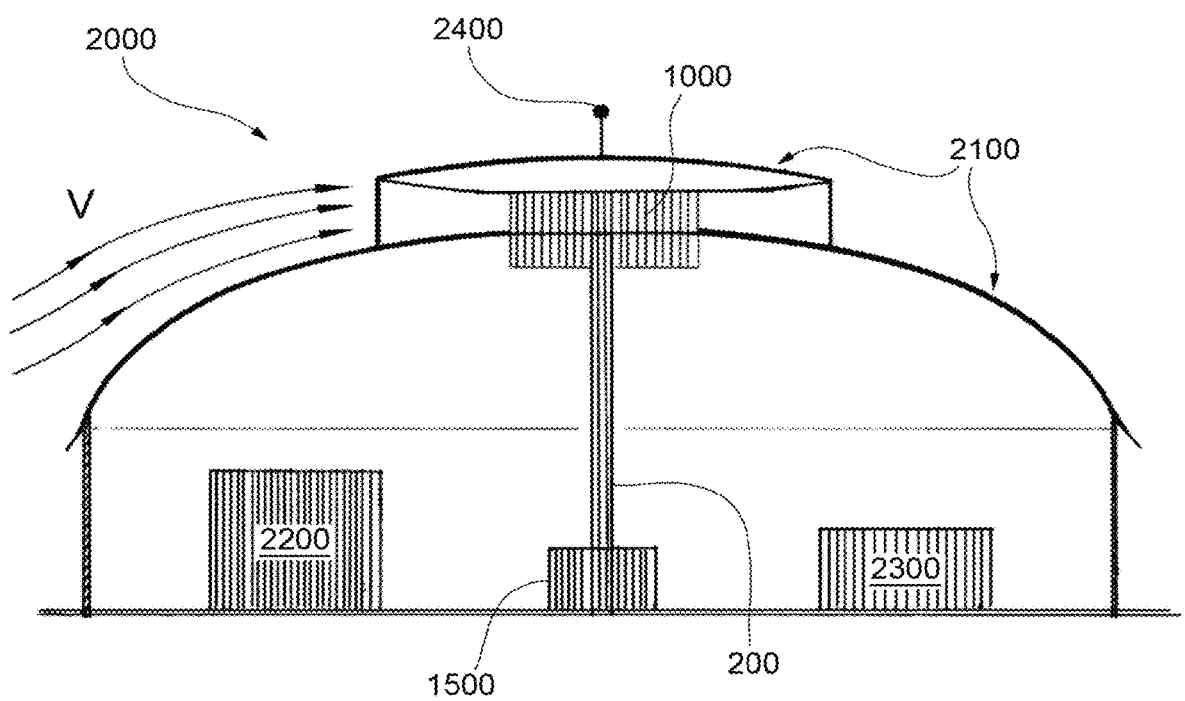
FIG. 8. Power station scheme for "mini-grids" in which the wind turbine integrates with solar panels, diesel generators and systems of accumulation.

FIG. 8 shows a power station scheme for "minigrid" 2000 in which the wind turbine 1000 (according to this description) with its generation module 1500 integrates with solar panels 2100, diesel generators 2200 and storage systems 2300. Minigrids are electrical networks of small extensions, suitable for providing electricity in small villages located in remote places where the main electricity distribution networks do not arrive.

In the case illustrated in FIG. 8, wind generation integrates with solar generation, eventually with diesel generators and in any case with storage systems. The various methods of electrical generation alternate with each other according to the atmospheric conditions, optionally detected by an anemometer 2400.

Figure 9:
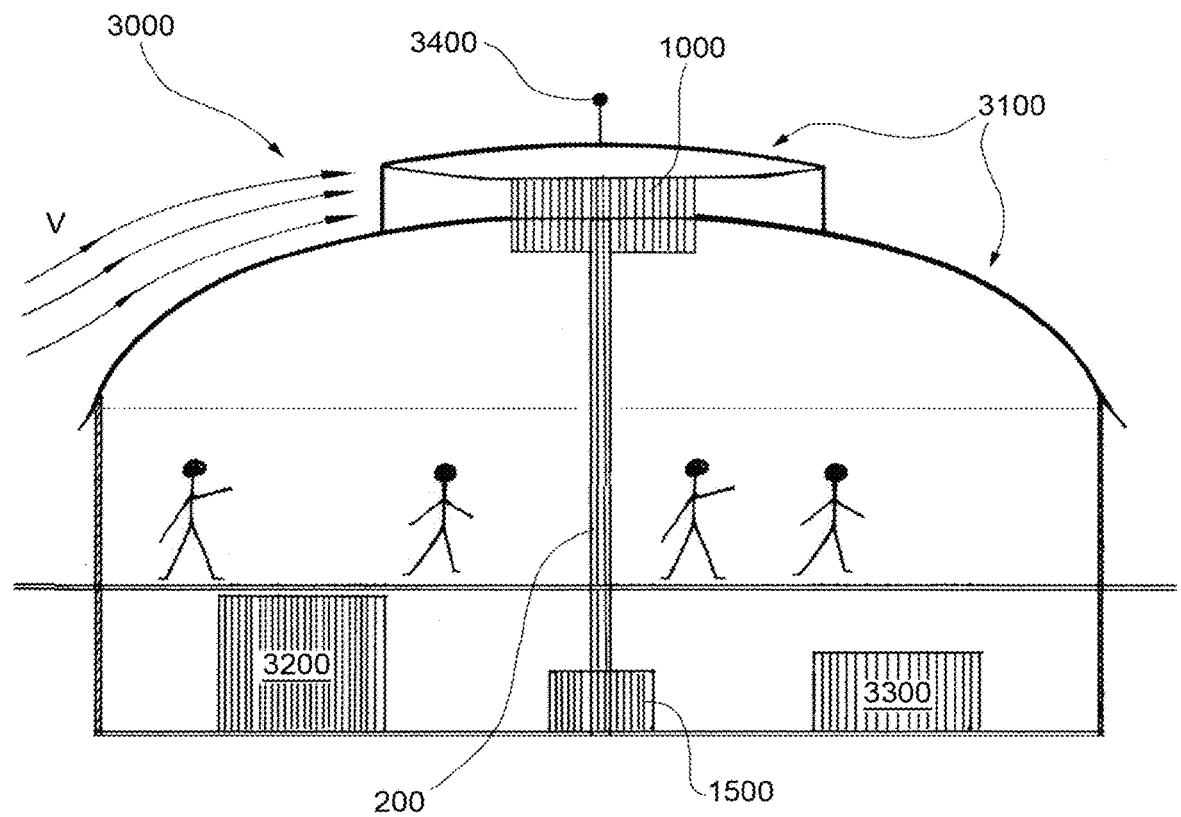
FIG. 9. Scheme of an energetically autonomous house in which the wind power of the turbine integrates with solar panels, diesel generators and systems accumulation.

FIG. 9 shows a house scheme 3000 energetically autonomous in which, also in this case, the wind turbine 1000 (with axis 200 and generation module 1500) integrates with solar panels 3100, diesel generators 3200 and storage systems 3300 that alternate with each other depending on weather conditions.

Figure 10:
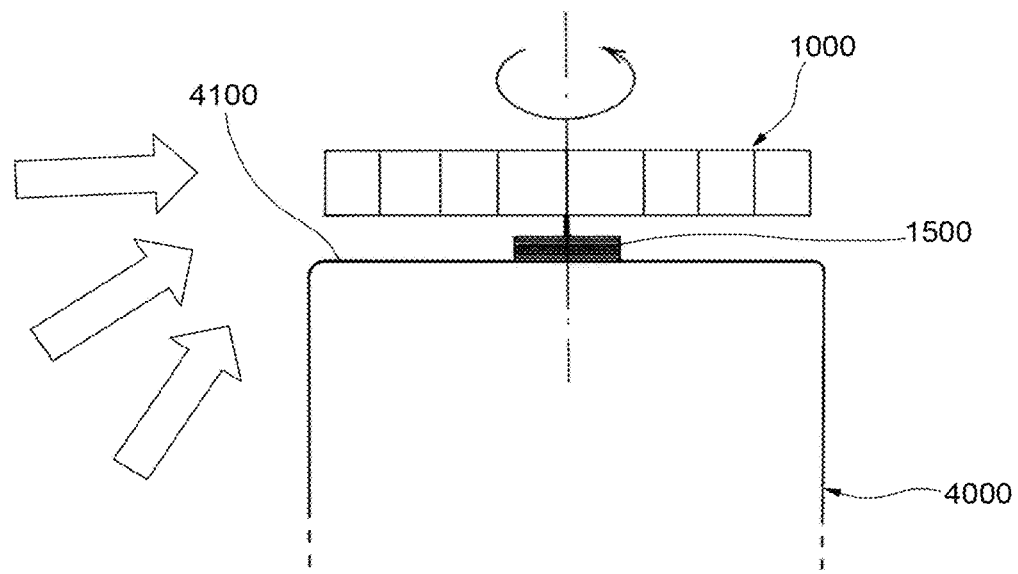
FIG. 10. Wind turbine layout positioned on the top of a skyscraper.

FIG. 10 shows a positioning scheme of the wind turbine 1000 according to the present description on the top 4100 of a skyscraper 4000, where, as it is known, strong winds are always present.

Figure 11:
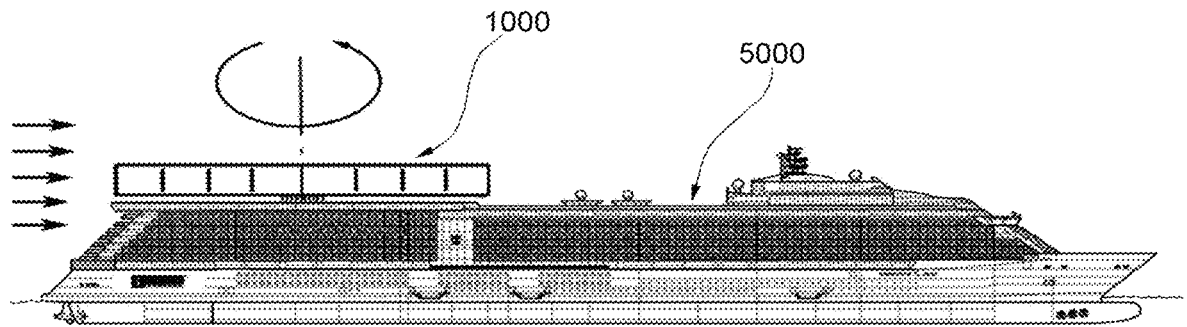
FIG. 11. Layout of the wind turbine positioned on a cruise ship.
Figure 12:
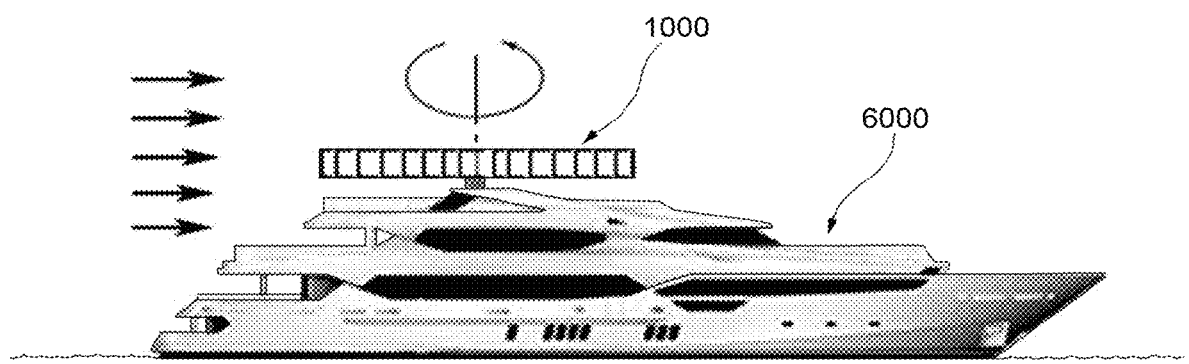
FIG. 12. Layout of the wind turbine positioned on a yacht.

FIG. 11 shows a positioning scheme of the wind turbine on a cruise ship 5000. It can be seen that due to the fact that the turbine of this description is characterized by having an horizontal plane of rotation, it can be advantageously positioned on the upper deck of the ship. FIG. 12, similarly, shows a positioning scheme of the wind turbine 1000 on a yacht 6000.

Figure 13:
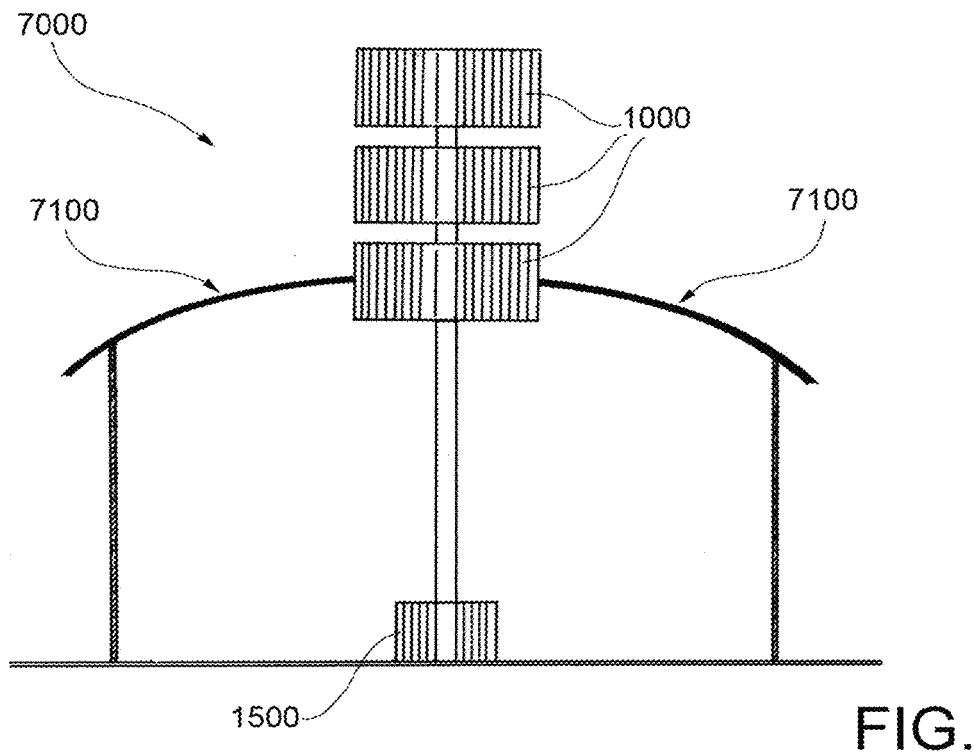
FIG. 13. Scheme of a multirotor wind turbine on ground.

FIG. 13 shows an on ground positioning wind turbine solution scheme 7000 with a number of overlapping rotors 1000 and integration with solar panels 7100.

Figure 14:
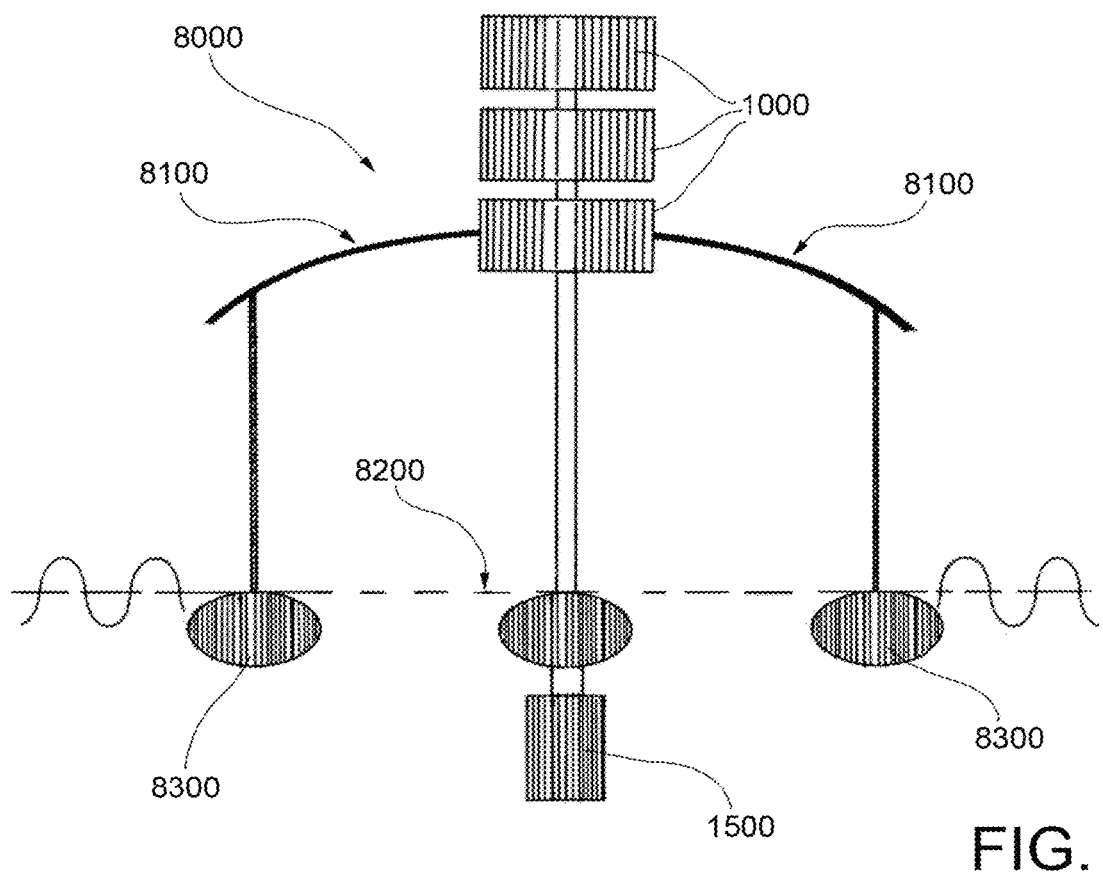
FIG. 14. Multirotor wind turbine layout in deep water (floating).

FIG. 14 shows a positioning scheme of the wind turbine 8000 with a certain number of rotors 1000 overlapped, in deep water (floating), also in this case with solar panels 8100 integration. 8200 indicates the surface of the water, and 8300 indicates bodies of appropriate shape and consistency for a response to the water wave motion.

Applications in the Case of One-Way Flow.

Figure 15:
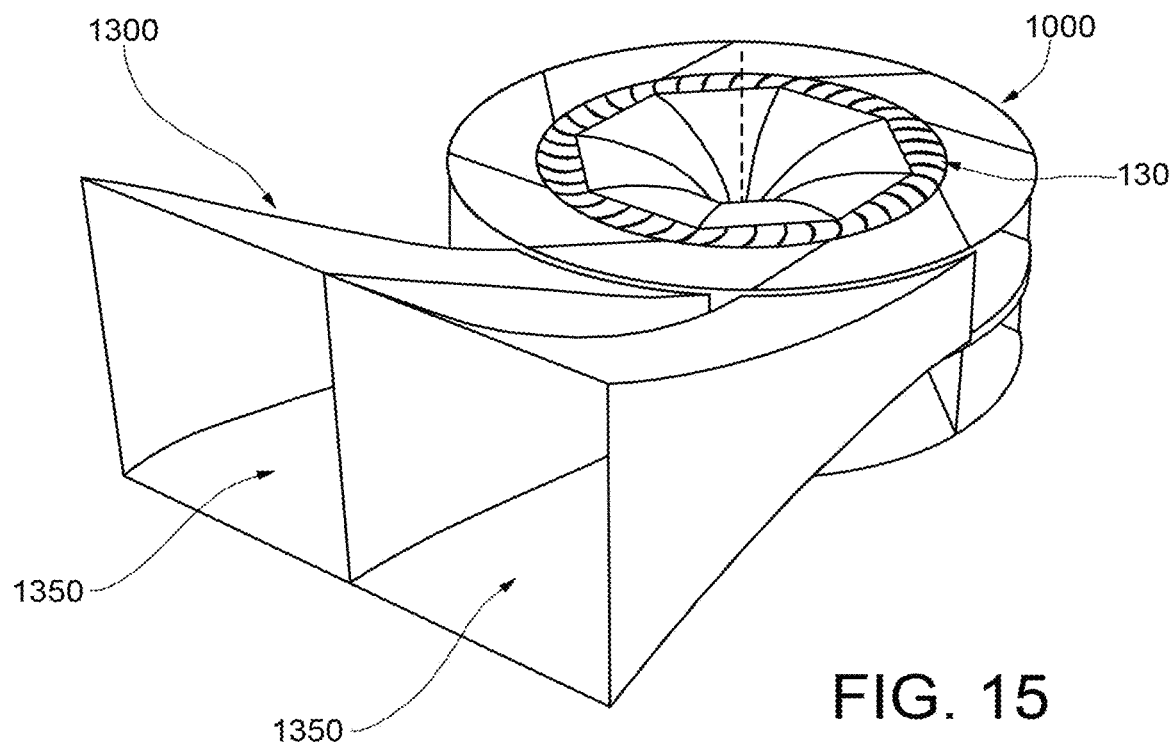
FIG. 15. Overall view of the impeller in "rendering" mode coupled with an unidirectional stator.

The applications of the turbine of the present invention in unidirectional flow cases are made by coupling the impeller 1000 to a stator 1300 which receives the fluid flow from only one direction, such as for example shown in FIG. 15.

Figure 16A:
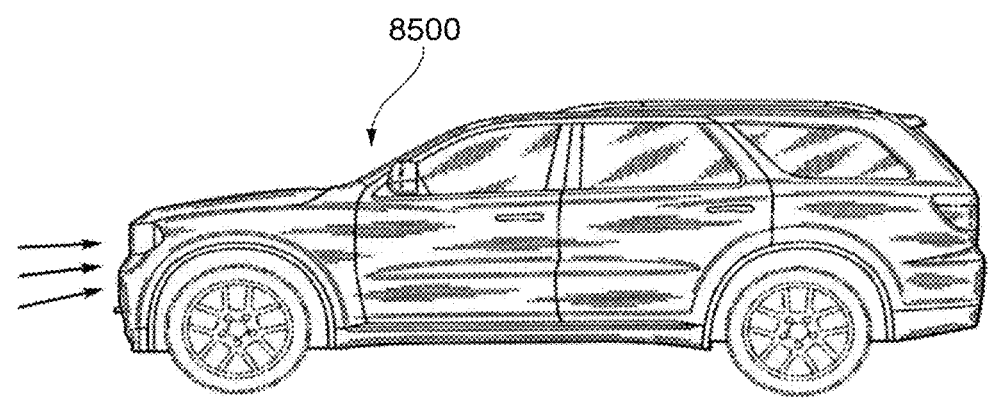
FIG. 16a. Scheme of traditional car.
Figure 16B:
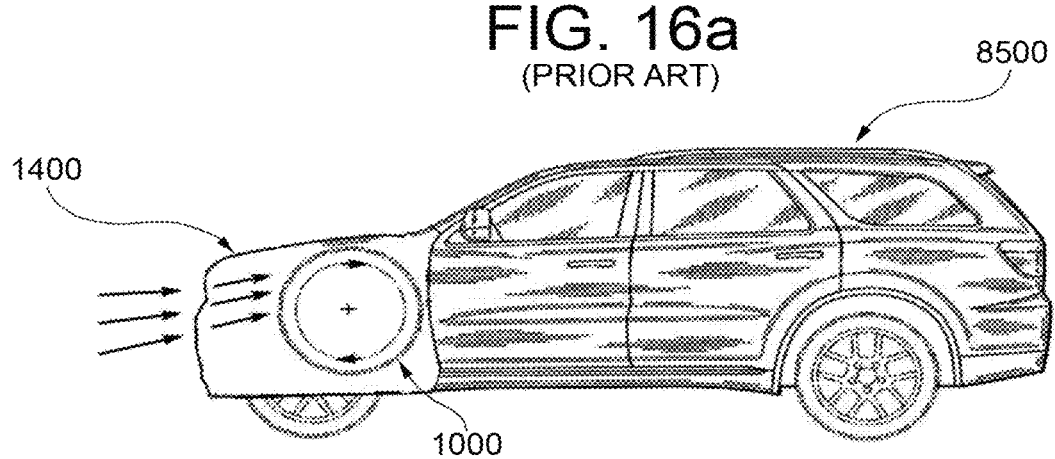
FIG. 16b. Layout of the present invention under the hood of an electric and/or hybrid car, in a "range extender" function.

A significant application of the turbine of the present invention in the case of one-way flow consists in using it as a "range extender" in electric and/or hybrid vehicles. If we consider for example the case of a car, as shown in FIGS. 16a and 16b, it is well known that considerable part of resistance to aerodynamic motion to which a car 8500 is subjected is that relating to the impact of air against the mask of the front radiator. In the case of an electric and/or hybrid car, all the space under the hood usually occupied by the internal combustion engine becomes free. One can therefore think of opening air intakes that direct the air flow towards the turbine impeller positioned under the hood (shown in FIG. 15) in such a way that the latter, coupled to an alternator, produces electricity during the movement of the car itself. The air intakes and the hood can be similar to a stator 1400 of the type of that of FIG. 15. From the physical point of view, the point is using the portion of the resistance force that generated at the moment of the impact of the air flow against the radiator front, to drive the turbine of the present description (instead of dissipating it in resistance to motion). In this way the electricity produced by the turbine of the present invention would increase the autonomy of an electric car or even would allow a hybrid car to operate in electric mode at speeds even considerably higher than those today allowed. It should be noted that the turbine of the present description positioned in this way would operate at all the speeds at which the car is able to move, even at the highest, thus generating ever greater quantities of electricity.

Practical Examples of Implementation

From the point of view of the analysis of prototypes of the present invention, both experimental and numerical activity has been carried out. Experimentally, laboratory equipment has been used which included an open circuit wind tunnel with an outlet section of width 65 cm and height 40 cm and a maximum air speed of 170 km/h, and a dynamometric brake of electric type, that is a set of tools and equipment able to measure the power at the turbine axis corresponding to given speeds of the oncoming air flow.

At the numerical level, numerical simulations were carried out concerning first a single element of the impeller and then the whole impeller in the case of monodirectional flow conveyed on the impeller itself by the converging inlet.

Figure 17:
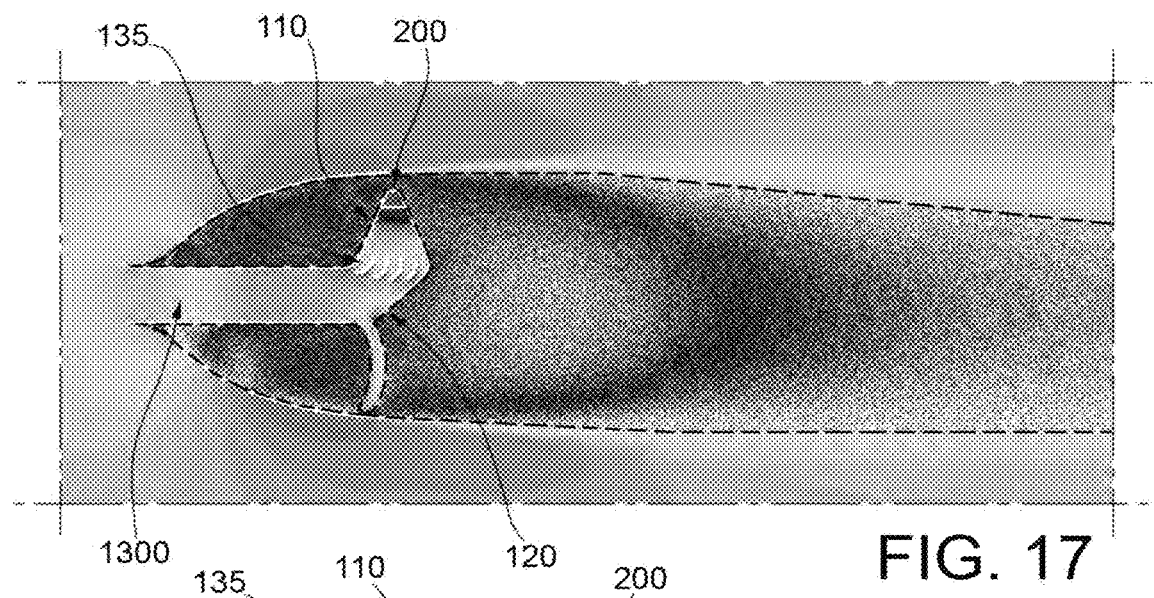
FIG. 17. Visualization of the results of a numerical simulation of the fluid flow passing through the top of a single impeller element of the present invention. Velocity field (reddish colors mirror highest fluid flow velocities values, bluish colors mirror lowest fluid flow velocity values).

FIG. 17 shows the visualization of the results of a numerical simulation of the fluid flow which passes through the upper part of a single element of the impeller of the present invention. The field represented is that of the velocity where colors close to red represent high values of the flow velocity, while colors close to blue represent low values of the flow velocity. It can be seen that the highest velocity values occur in the section 110 connected with the axis 200 in which the 180° flow deviation occurs. It may also be noted how the velocity and therefore the overall flow trend is remarkably regular.

Figure 18:
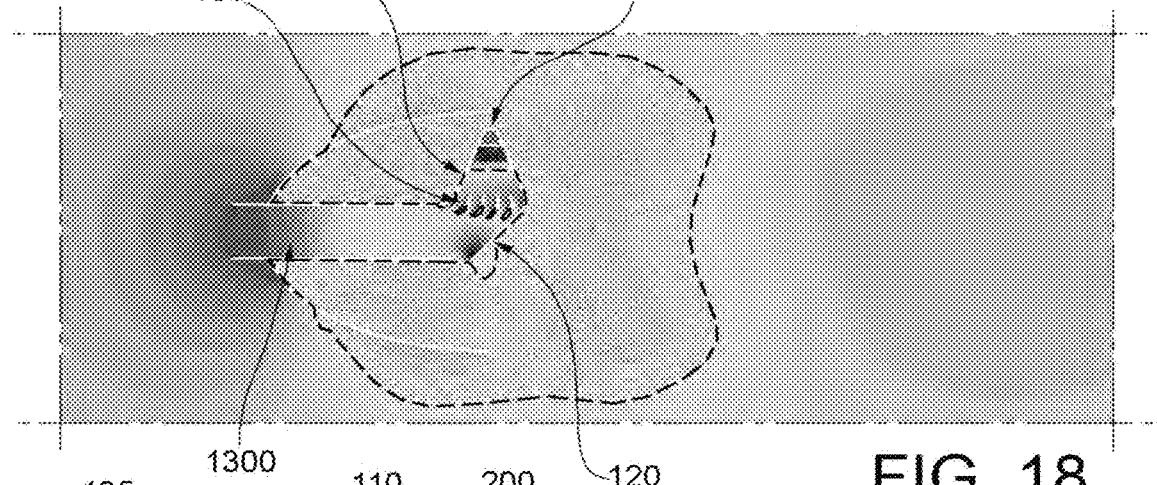
FIG. 18. Visualization of the results of a numerical simulation of the fluid flow passing through the top of a single impeller element of the present invention. Pressure field (reddish colors mirror highest pressure values, bluish colors mirror lowest pressure values).

FIG. 18 shows the visualization of the results of a numerical simulation of the fluid flow which passes through the upper part of a single element of the impeller of the present invention. The field shown is that of the pressures, in which colors close to red represent high pressure values, while colors close to blue represent low pressure values. It can be seen—corresponding to what has been noted in FIG. 17—how the lowest pressure values occur in the section 110 connected with the axis 200 in which the 180° current deviation occurs. It can also be noted how the pressure distribution and therefore again the overall flow trend is remarkably regular. The flow around the airfoil profiles 135 also behaves regularly.

Figure 19:
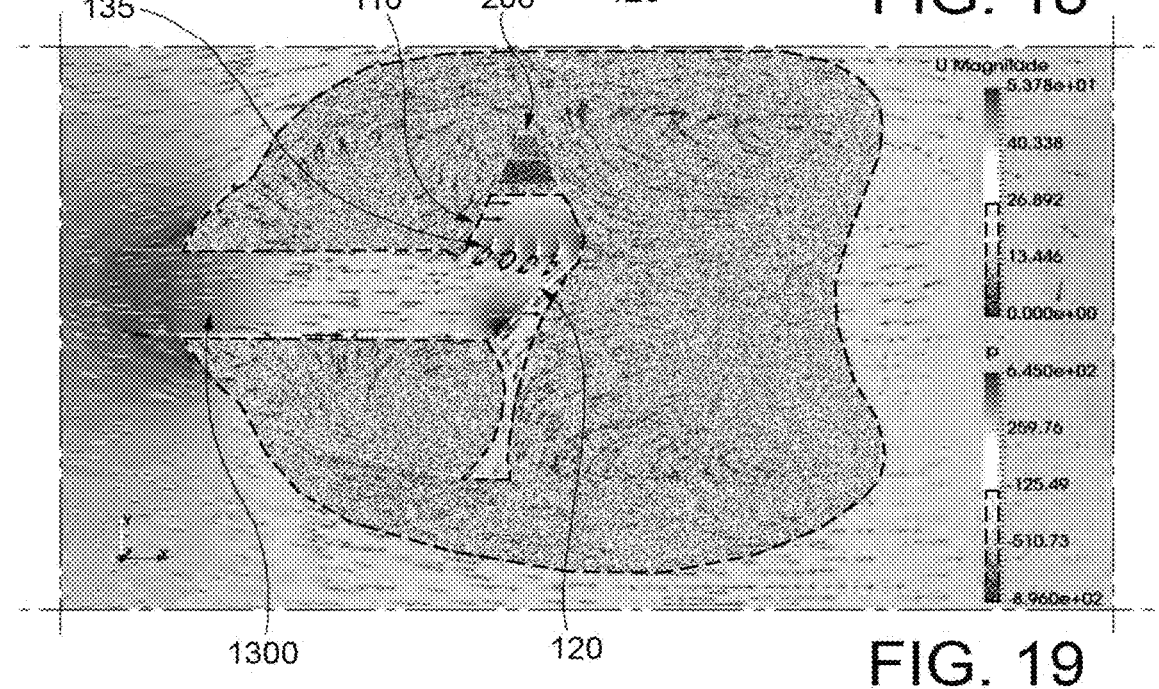
FIG. 19. Visualization of the results of a numerical simulation of the fluid flow passing through the top of a single impeller element of the present invention. Vectors field of flow velocity (reddish colors mirror highest fluid flow velocity values, bluish colors mirror lowest fluid flow velocity values, pressure field in the background).

FIG. 19 shows the visualization of the results of a numerical simulation of the fluid flow which passes through the upper part of a single element of the impeller of the present invention. The field represented is that of the velocity vectors in which colors close to red represent high values of velocity vectors, colors close to blue represent low values velocity vectors, while the background reflects the pressure field. It can be noted the regularity of the velocity vectors in every zone of the domain of calculation. It should also be noted that the background colors show a depression in the input section where in FIG. 17 there is a higher velocity.

Figure 20:
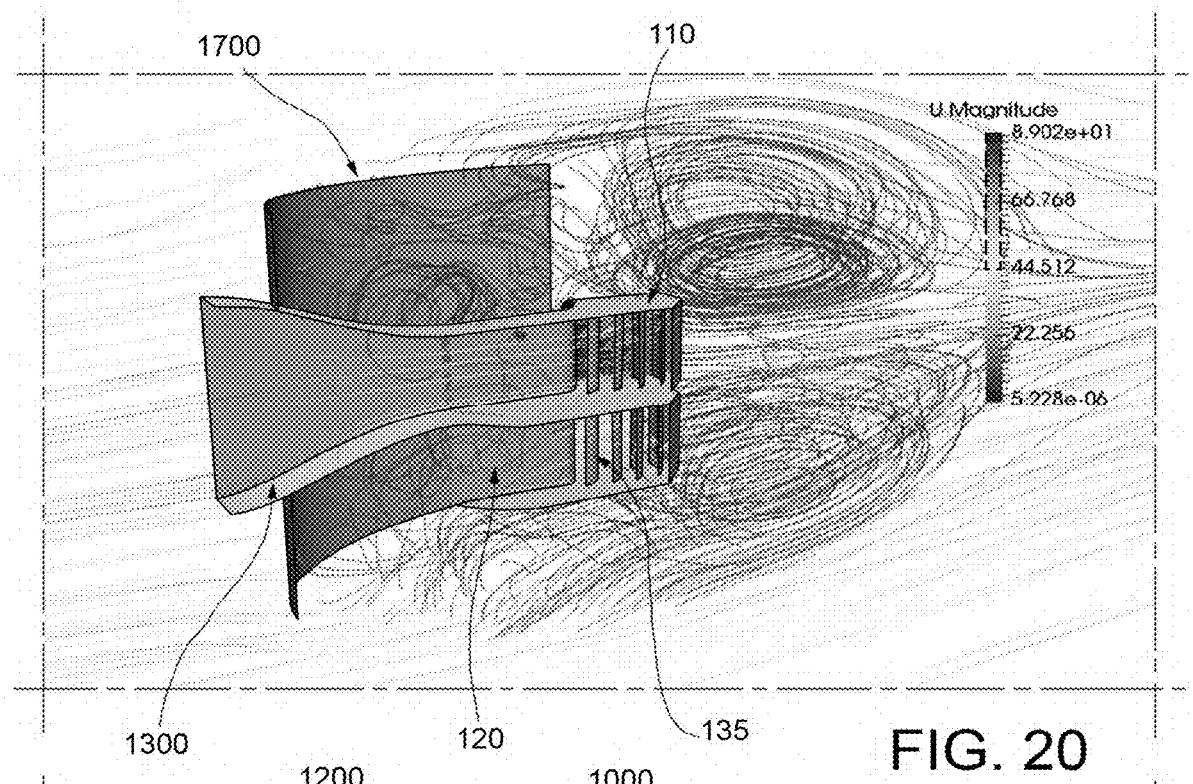
FIG. 20. Visualization of the results of a numerical simulation of the fluid flow passing through a single impeller element of the present invention in the presence of a convergent stator at the input. Streamlines field.

FIG. 20 shows the visualization of the results of a numerical simulation of the fluid flow which passes through a single element of the impeller of the present invention in the presence of a converging stator 1300 at the inlet. The represented field is that of the streamlines. It can noted their regularity especially in the whole inlet area and in the curve where the 180° deviation occurs (the lines outside the elements of the impeller are recirculation lines that are here of not interest). Element 1700 is a deflector used to ensure that the air flow enters only stators 1300.

Figure 21:
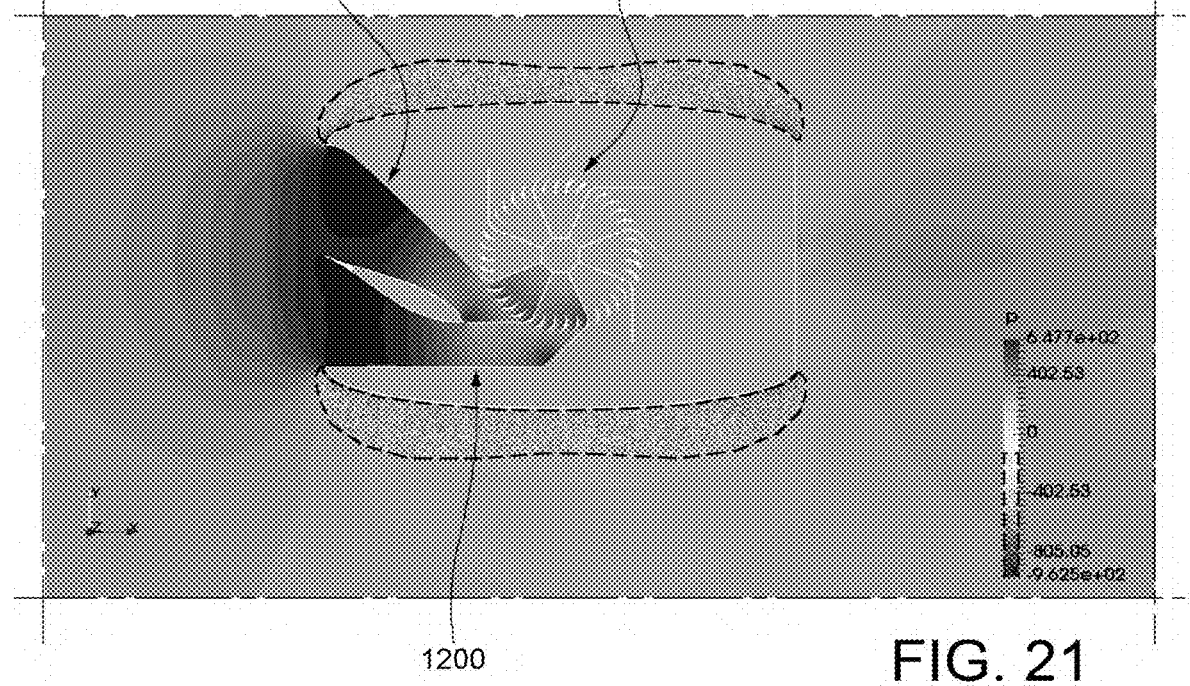
FIG. 21. Visualization of the results of a numerical simulation of the fluid flow passing through the upper part of the entire impeller coupled with a double stator converging at the input (FIG. 15). Velocity field (reddish colors mirror highest fluid flow velocities values, bluish colors mirror lowest fluid flow velocity values).

FIG. 21 shows the visualization of the results of a numerical simulation of the fluid flow passing through the upper part of the complete impeller whit double stator 1200 converging at the inlet (of the type of that of FIG. 15). The represented field is that of the velocity in which colors close to red represent high values of the flow velocity, while colors close to blue represent low values of the flow velocity. Also in this case the represented field of motion appears quite regular and free of disturbances.

Figure 22:
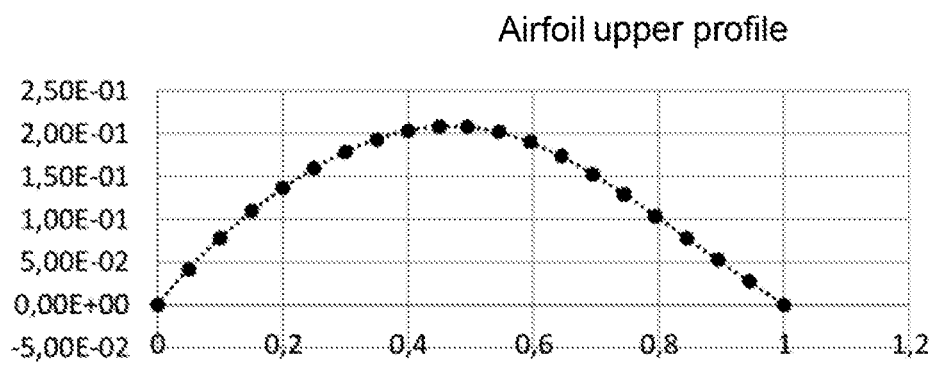
FIG. 22. Optimized simulated profile of an airfoil element at the top of the impeller (when oriented as in the figure), according to an embodiment in which the upper portion receives the fluid flow.
Figure 23:
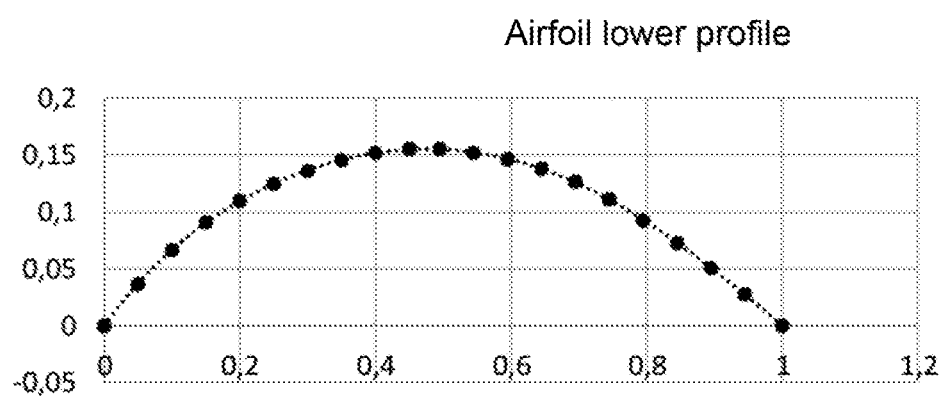
FIG. 23. Optimized simulated profile of an airfoil element at the bottom of the impeller (when oriented as in the figure), according to an embodiment in which the upper portion receives the fluid at the inlet.

FIG. 22 shows an example of a simulated profile for an element 135 of the upper section of the impeller 1000, which can be different from that of a corresponding element 135 of the lower section of the impeller 1000, as seen in FIG. 23, the profiles being described by the following polynomial functions:

$$y = -3,3049x^6 + 10,466x^5 - 11,687x^4 + 5,651x^3 - 2,073x^2 + 0,9494x - 0,0005$$

$$y=-0{,}6078x^6+2{,}7466x^5-4{,}4618x^4+3{,}4567x^3-1{,}9694x^2+0{,}8361x-0{,}0003$$

Figure 24:
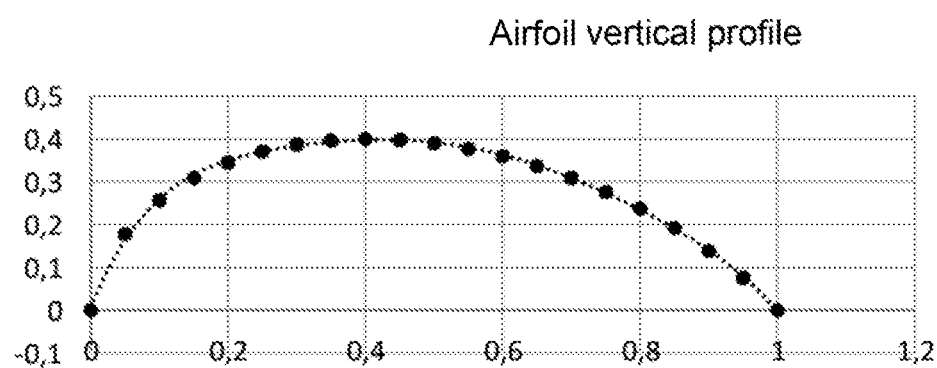
FIG. 24. Optimized simulated profile of the separator baffle in the impeller according to a possible embodiment of the present invention.

FIG. 24 shows an example of an optimized profile for separator baffles that allow a change of direction of the flow to 180° vertically, the optimized profile follows the polynomial equation:

$$y=-17{,}013x^6+56{,}885x^5-75{,}466x^4+50{,}411x^3-18{,}81x^2+3{,}9846x+0{,}0059$$

Example of Vertical Modular Realization

Figure 25:
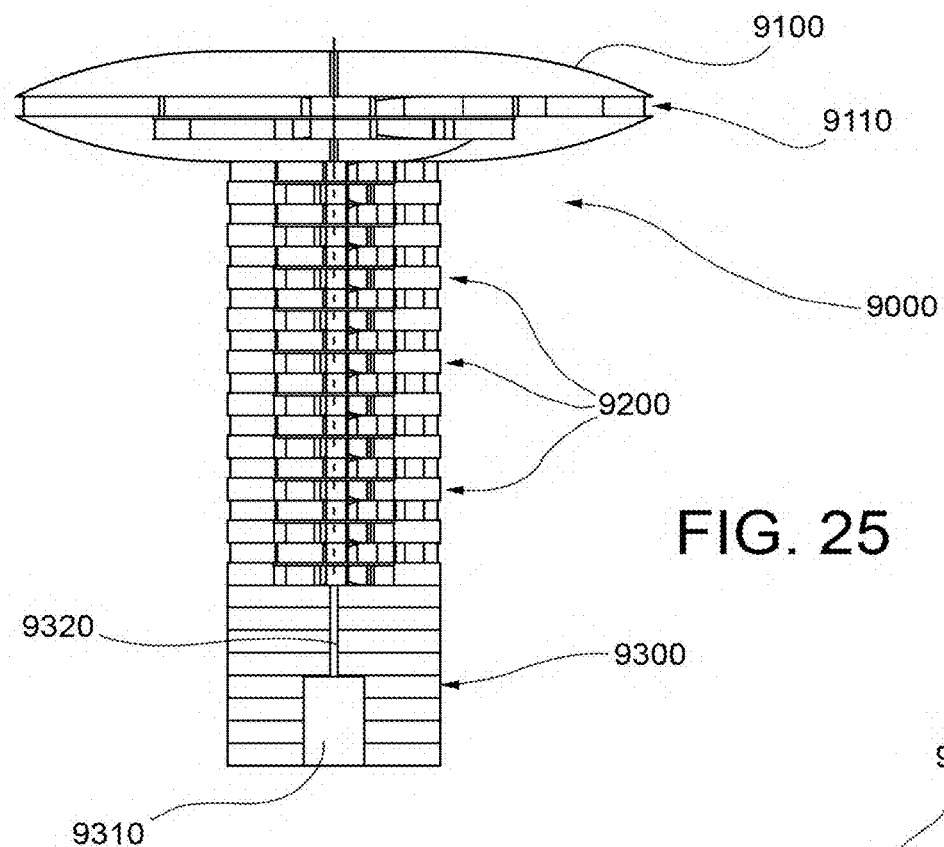
FIGS. 25-27 show an aeolian tower that includes a plurality of turbines according to the present invention, in different views.
Figure 26:
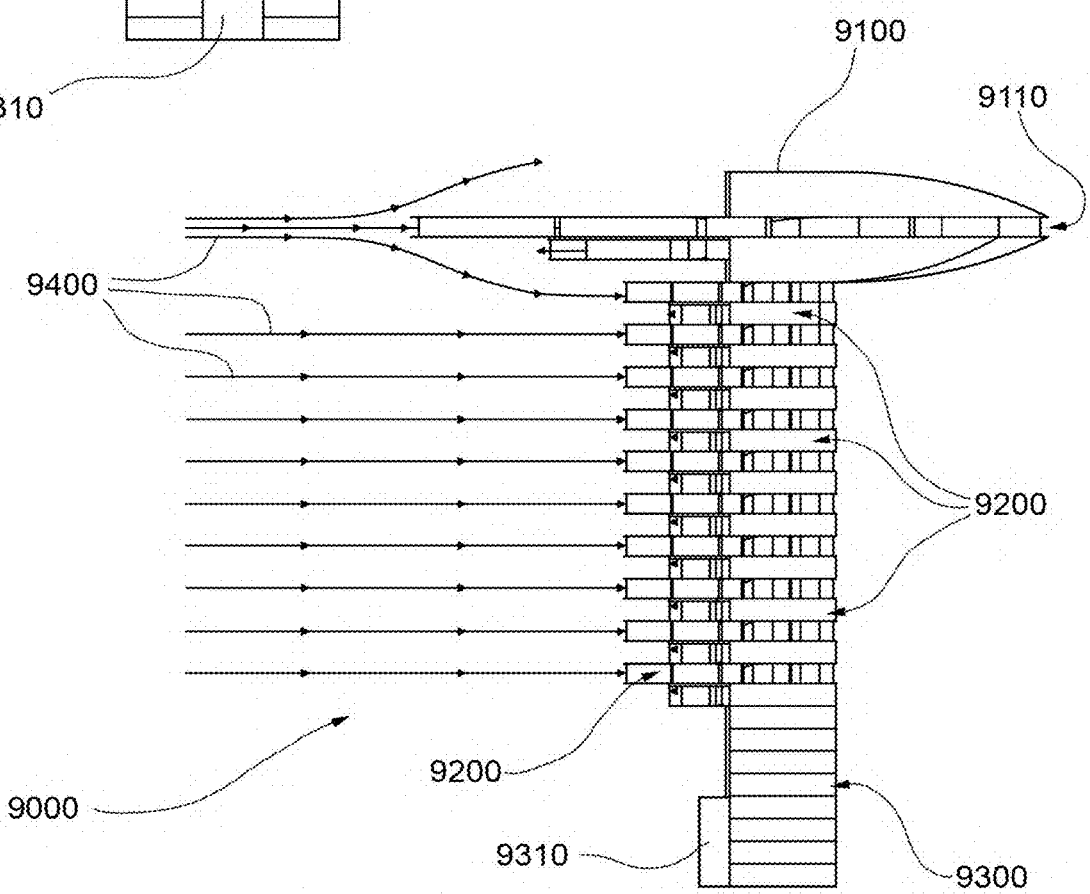
Figure 27:
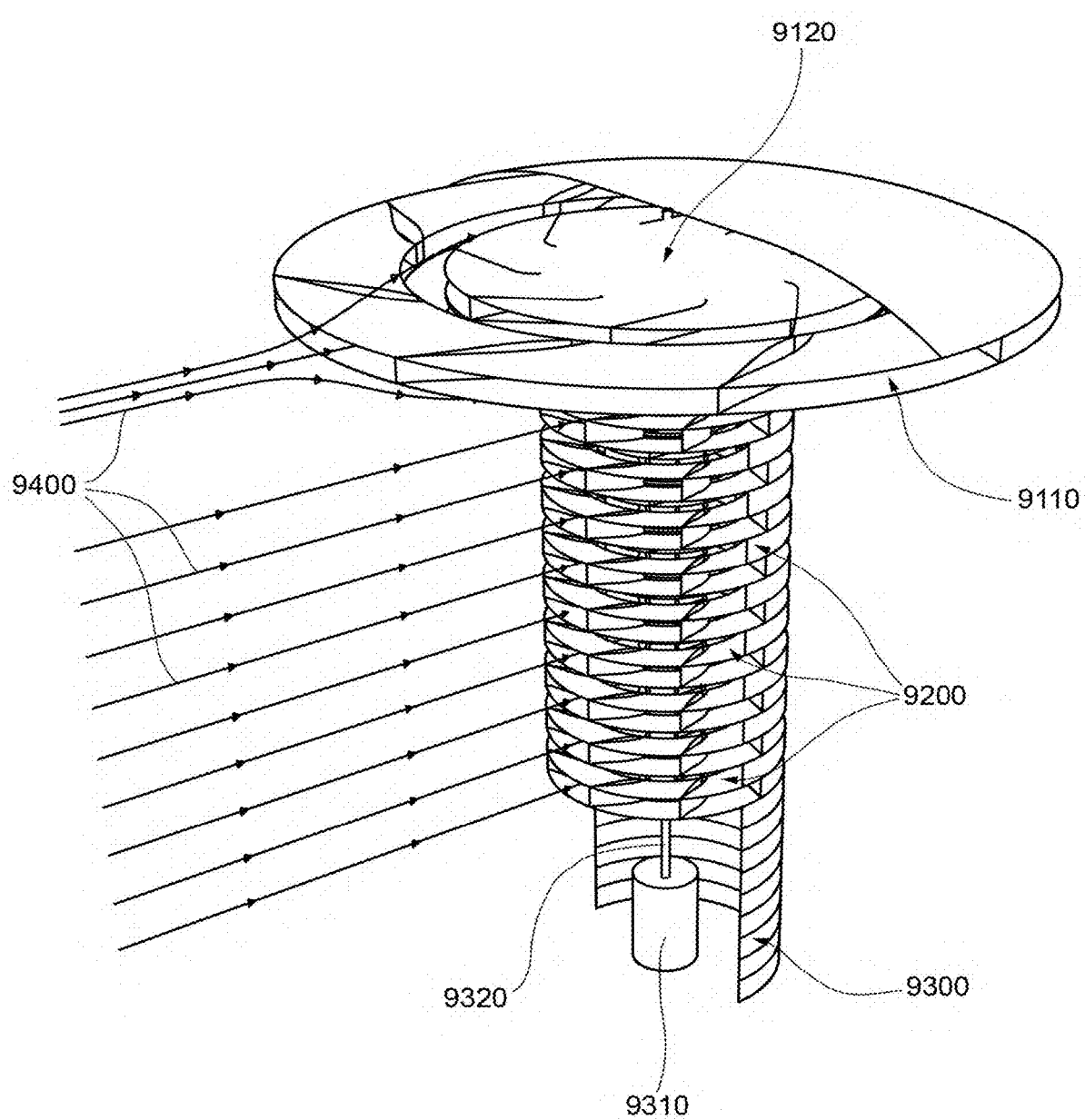

Referring to FIGS. 25-27, an example of vertical modular realization is illustrated.

A wind tower 9000 is shown which includes a plurality of turbines 9100, 9200 according to the present invention. The turbine 9100 on the of the tower (substantially) along the direction of gravity force is wider, while the others are smaller in diameter, so one can put several on the tower itself (the top one catches the stronger winds). All the machines are connected to axis 9320 which transfers mechanical energy to the energy generator 9310 located at the base 9300 of the wind tower 9000.

FIG. 26 shows a partially open side view with indication of the direction of air entry into the various turbines. The air 9400 in the top turbine enters the slot 9110 of the crankcase (which surrounds the real impeller 9120, as described above) and that which instead is diverted downwards into the turbine just below.

In FIG. 27 the same wind tower is shown with the view of FIG. 16 but in perspective.

The advantages of such a wind tower are the exploitation of space for a greater production of wind energy, containing the costs of the energy generator which is unique for all turbines. However, there is nothing to prevent placing more energy generators for corresponding sub-groups of turbines, always along the same vertical axis.

Advantages of the Invention

In addition to the advantages discussed above in relation to the known art, others advantages of the impeller of the present invention are:
  i) flexibility of use in the sense that the impeller can be mounted in a configuration with both vertical and horizontal axes,
  ii) the intrinsic simplicity of the device, in the sense that there is no need for particular stress control systems or other parameters, compared to what happens in the impellers of known wind turbines,
  iii) as a consequence, considerably lower manufacturing and operational costs as compared to the impellers of known wind turbines,
  iv) the impeller of the present invention is "self-starting" in the sense that it starts up by itself as soon as the wind speed reaches a minimum value, differently from to the wind impellers of known turbines that need an initial supply of energy to start moving.

As for the wind tower, there are among other things the following advantages. First of all, the assembly of the turbine of the present invention into a wind tower of the proposed form is simpler, the tower itself is more solid (in the sense that it is able to withstand even very strong winds), it is easier to build and assemble (in the sense that the wind towers of known technology require a very complex work in its construction phases), moreover, in the case of wind farms with several wind turbines, the decrease in turbine performance caused by the interaction with the wake of the adjacent rotors is completely eliminated.

In addition, there is a lower visual (landscape), sound (noise) and birdlife environmental impact. As regards the visual impact, the wind tower of the proposed form, which does not have the typical blades, manages to maintain a visual and dimensional harmony between generators and the surrounding environment, in addition to canceling, in this case, the alternation of light and shadow linked to the passage of the blades in front of the sun. As for noise, this is drastically reduced considering that the inside of the wind tower of the proposed form can be easily insulated with soundproofing material. As for the impact on birds, the absence of the typical blades drastically reduces the killing of birds that might find the tower of the proposed form along their migratory route.

REFERENCES

[1] Pache A. A., 1920, "Moteur a vent", N. 86802, Switzerland
[2] Bert et de Keravenant, 1939, "Turbo-pompe", N. 843.638, France
[3] Karlsson J., Raimel G., 1979, "Apparatus for recovering energy from a flowing stream of fluid", N. 2013790 A, UK
[4] Nica N., 2006, "Boundary Layer wind turbine", N. WO 2006/089425 A1, PCT
[5] Sheikhrezai R. J., 2009, Wind energy system with wind speed accelerator and wind catcher", N. US 2009/0315332 A1, USA
[6] Alfonsi G., 2012, "Turbina ad elevate prestazioni, particolarmente a potenza specifica incrementata", N. 0001396927, Italy
[7] Alfonsi G., 2015, "High-performance turbine with increased specific power", N. U.S. Pat. No. 9,206,784 B2, USA
[8] Alfonsi G., 2016, "High-performance turbine with increased specific power", N. ZL 201080051010.8, China The preferred embodiments have been described and variants of the present invention have been suggested, but it is to be understood that those skilled in the art will be able to make modifications and changes without thereby departing from the corresponding scope of protection, as defined by the attached claims.

The invention claimed is:

1. A turbine impeller configured to be driven by a fluid flow, having:
  an axis of rotation, and
  a plurality of constituent elements arranged around said axis of rotation,
  wherein each constituent element of said plurality of constituent elements comprises:
    an internal portion comprising a first opening and a second opening placed at two different heights with respect to said axis of rotation and connected by a chamber configured to be run through by the fluid flow, said chamber having an extension development in axial direction and converging towards said axis of rotation;
    a first middle portion fluidically connected to said first opening, and a second middle portion fluidically connected to said second opening, said first and said second middle portions being configured to deflect the fluid flow from a radial direction to a direction at an angle (a) from said radial direction on a plane perpendicular to said axis of rotation; and
    a first external portion fluidically connected to said first middle portion, and a second external portion fluidically connected to said second middle portion, said first and second external portions being convergent respectively towards said first and second middle portions;

and wherein only said first and said second middle portions include each one or more internal airfoils configured to deflect the fluid flow from said radial direction to said direction at the angle ($\alpha$) and to increase a rotational force generated by the interaction between the fluid flow and the plurality of constituent elements of the turbine impeller.

2. The turbine impeller of claim 1, wherein said internal portion comprises a plurality of internal separating baffles configured to deflect the fluid flow by 180° between said first opening and said second opening or vice versa, wherein the separating baffles of the plurality of internal separating baffles are concentric with respect to a direction on said plane.

3. The turbine impeller of claim 1, wherein the angle ($\alpha$) is between 60 and 130 sexagesimal degrees.

4. The turbine impeller of claim 3, wherein the angle ($\alpha$) is between 85 and 105 sexagesimal degrees.

5. The turbine impeller of claim 1, wherein a stator is fluidically connected to said turbine impeller, the stator comprising at least one convergent element that is convergent towards said axis of rotation and fluidically connected to the second external portion of a constituent element of said plurality of constituent elements of said turbine impeller.

6. The turbine impeller of claim 5, wherein the stator comprises a plurality of convergent elements fluidically connected to as many constituent elements of the turbine impeller.

7. The turbine impeller of claim 5, wherein the stator comprises walls capable of protecting, in use, said first external portion from said fluid.

8. A turbine, comprising a turbine impeller, an axis of rotation and a generation module, wherein said turbine impeller is the turbine impeller of claim 1.

9. A vertical wind tower, comprising a plurality of turbines, each having comprising a turbine impeller and an axis of rotation, wherein the turbines of said plurality of turbines are configured to transfer impeller motion to a common axis,
wherein said common axis is configured to transfer motion of the common axis to one energy generator, and the turbine impeller is according to claim 1.

10. The vertical wind tower of claim 9, wherein the energy generator is housed in a base of the vertical wind tower.

11. The vertical wind tower of claim 9, wherein the energy generator is an electric power generator.

\* \* \* \* \*